United States Patent
Desai et al.

(10) Patent No.: US 9,504,056 B2
(45) Date of Patent: **\*Nov. 22, 2016**

(54) METHOD AND SYSTEM FOR SHARING A SINGLE ANTENNA ON PLATFORMS WITH COLLOCATED BLUETOOTH AND IEEE 802.11 B/G DEVICES

(75) Inventors: Prasanna Desai, Olivenhain, CA (US); Brima Ibrahim, Aliso Viejo, CA (US)

(73) Assignee: Broadcom Corporation, Irvine, CA (US)

(\*) Notice: Subject to any disclaimer, the term of this patent is extended or adjusted under 35 U.S.C. 154(b) by 1583 days.

This patent is subject to a terminal disclaimer.

(21) Appl. No.: 11/143,378

(22) Filed: Jun. 2, 2005

(65) Prior Publication Data

US 2006/0030265 A1    Feb. 9, 2006

Related U.S. Application Data

(60) Provisional application No. 60/600,184, filed on Aug. 9, 2004.

(51) Int. Cl.
| | |
|---|---|
| *H04B 7/00* | (2006.01) |
| *H04W 72/12* | (2009.01) |
| *H04W 88/06* | (2009.01) |

(52) U.S. Cl.
CPC ..... *H04W 72/1215* (2013.01); *H04W 72/1242* (2013.01); *H04W 88/06* (2013.01)

(58) Field of Classification Search
CPC ........................................................ H04B 7/04
USPC .............. 455/41.2, 67.11, 502, 552.1, 553.1, 455/575.7
See application file for complete search history.

(56) References Cited

U.S. PATENT DOCUMENTS

| | | |
|---|---|---|
| 6,763,483 B2 | 7/2004 | Penick et al. |
| 6,842,607 B2 \* | 1/2005 | Godfrey et al. ............. 455/41.2 |

(Continued)

FOREIGN PATENT DOCUMENTS

| | | |
|---|---|---|
| CN | 1496020 | 5/2004 |
| EP | 1119137 | 7/2001 |

(Continued)

OTHER PUBLICATIONS

Nada Golmie, Nicolas Chevrollier and Olivier Rebala, *Bluetooth and WLAN Coexistence: Challenges and Solutions*, IEEE Wireless Communications, Dec. 2003. pp. 22-29.

(Continued)

*Primary Examiner* — Ping Hsieh
(74) *Attorney, Agent, or Firm* — McDermott Will & Emery LLP

(57) ABSTRACT

A method and system for sharing a single antenna on platforms with collocated Bluetooth and IEEE 802.11 b/g devices are provided. A single antenna may be utilized for communication of Bluetooth HV3 frame traffic and wireless local area network (WLAN) communication based on a time multiplexing approach. At least one antenna switch may be utilized to configure an antenna system to enable Bluetooth and WLAN coexistence via the single antenna. Configuration signals may be generated by a Bluetooth radio device and/or by a WLAN radio device to configure the antenna system. A default configuration for the antenna system may provide WLAN communication between a station and a WLAN access point until Bluetooth communication becomes a priority.

24 Claims, 11 Drawing Sheets

(56) References Cited

U.S. PATENT DOCUMENTS

| | | | |
|---|---|---|---|
| 6,950,627 B2* | 9/2005 | Vicari | 455/41.2 |
| 6,954,616 B2* | 10/2005 | Liang et al. | 455/63.1 |
| 7,046,649 B2* | 5/2006 | Awater et al. | 370/338 |
| 7,072,616 B2* | 7/2006 | Godfrey | 455/41.2 |
| 7,194,283 B2 | 3/2007 | Kardach et al. | |
| 2001/0010689 A1 | 8/2001 | Awater et al. | |
| 2002/0024469 A1 | 2/2002 | Masaki | |
| 2002/0049075 A1* | 4/2002 | Takagi | 455/553 |
| 2003/0133469 A1* | 7/2003 | Brockmann et al. | 370/445 |
| 2004/0048577 A1 | 3/2004 | Godfrey et al. | |
| 2004/0116075 A1 | 6/2004 | Shoemake et al. | |
| 2004/0165576 A1* | 8/2004 | Reunamaki | 370/350 |
| 2005/0020299 A1 | 1/2005 | Malone et al. | |
| 2005/0026637 A1* | 2/2005 | Fischer et al. | 455/502 |
| 2005/0059347 A1* | 3/2005 | Haartsen | 455/41.2 |
| 2005/0215167 A1* | 9/2005 | Neil et al. | 445/26 |
| 2005/0215197 A1 | 9/2005 | Chen et al. | |
| 2005/0239451 A1 | 10/2005 | Periyalwar et al. | |
| 2005/0239474 A9* | 10/2005 | Liang | 455/454 |
| 2006/0056332 A1* | 3/2006 | Arase et al. | 370/328 |

FOREIGN PATENT DOCUMENTS

| | | |
|---|---|---|
| EP | 1199842 A | 4/2002 |
| EP | 1389855 | 2/2004 |
| WO | WO-2004/023746 A | 3/2004 |

OTHER PUBLICATIONS

*Draft Recommended Practice for Information Technology—Telecommunications and Information Exchange Between Systems—Local and Metropolitan Area Networks Specific Requirements, Part 15.2: Coexistence of Wireless Personal Area Networks with Other Wireless Devices Operating in Unlicensed Frequency Bands*, IEEE Standards Activities Department, Standard Licensing and Contracts, IEEE P802.15.2/Draft #05, Mar. 15, 2002, pp. 1-98.

Brian P. Crow, Indra Widjaja, Jeong Geun Kim, and Prescott T. Sakai, *IEEE 802.11 Wireless Local Area Networks*, IEEE Communications Magazine, Sep. 1997, pp. 116-126.

* cited by examiner

METHOD AND SYSTEM FOR SHARING A SINGLE ANTENNA ON PLATFORMS WITH COLLOCATED BLUETOOTH AND IEEE 802.11 B/G DEVICES

CROSS-REFERENCE TO RELATED APPLICATIONS/INCORPORATION BY REFERENCE

This patent application makes reference to, claims priority to and claims benefit from U.S. Provisional Patent Application Ser. No. 60/600,184, filed on Aug. 9, 2004.

This application makes reference to U.S. application Ser. No. 11/143,559 filed Jun. 2, 2005.

The above referenced applications are hereby incorporated herein by reference in their entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to interference in communication systems. More specifically, certain embodiments of the invention relate to a method and system for sharing a single antenna on platforms with collocated Bluetooth and IEEE 802.11b/g devices.

BACKGROUND OF THE INVENTION

The use of Wireless Personal Area Networks (WPANs) has been gaining popularity in a great number of applications because of the flexibility and convenience in connectivity they provide. WPAN systems, such as those based on Bluetooth (BT) technology, replace cumbersome cabling and/or wiring used to connect peripheral devices and/or mobile terminals by providing short distance wireless links that allow connectivity within a 10-meter range. In contrast to WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

When operating a Bluetooth radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth signal may interfere with a WLAN signal or a WLAN signal may interfere with a Bluetooth signal. The second effect may occur when the Bluetooth and WLAN radio devices are collocated, that is, when they are located in close proximity to each other so that there is a small radio frequency (RF) path loss between their corresponding radio front-end receivers. In this instance, the isolation between the Bluetooth radio front-end and the WLAN radio front-end may be as low as 10 dB, for example. As a result, one radio may desensitize the front-end of the other radio upon transmission. Moreover, since Bluetooth employs transmit power control, the collocated Bluetooth radio may step up its power level when the signal-to-noise ratio (SNR) on the Bluetooth link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth communication, then isochronous Bluetooth packet traffic, which does not have retransmission capabilities, may be starved of communication bandwidth. Moreover, this approach may also starve other Bluetooth packet traffic of any communication access. Collocated WLAN/Bluetooth radio devices should therefore be operated so as to maintain WLAN communication rates high while also providing access to Bluetooth communication when necessary.

Different techniques have been developed to address the low isolation problem that occurs between collocated Bluetooth and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth and WLAN radio devices, where collaboration refers to any direct communication between the protocols. For example, Bluetooth technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, between 79 1 MHz channels in the Bluetooth piconet. AFH provides a non-collaborative mechanism that may be utilized by a Bluetooth device to avoid frequencies occupied by a spread spectrum system such as a WLAN system. In some instances, the Bluetooth radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desense the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth radio device receiver when the isolation between radio devices is only 10 dB. Similarly, when a Bluetooth radio device is transmitting and a WLAN radio device is receiving, particularly when the Bluetooth radio front-end transmitter is operating as a 20 dBm Class 1 type, the WLAN radio device receiver may be desensed by the Bluetooth transmission as the isolation between radios is reduced. Due to high-volume, low-cost nature of WLAN and BT radio chips, the more expensive Surface Acoustic Wave (SAW) filtering devices that may filter out blocking signals from nearby channels are not generally utilized and collocated WLAN/Bluetooth radio device interference remains a concern in WPAN applications.

Other techniques may be based on collaborative coexistence mechanisms, such as those described in the IEEE 802.15.2-2002 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth interfering signals. These techniques may result in some transmission inefficiencies or in the need of additional hardware features in order to achieve better coexistent operation.

Other collaborative coexistence mechanisms may be based on proprietary technologies. For example, in some instances, firmware in the collocated WLAN radio device may be utilized to poll a status signal in the collocated Bluetooth radio device to determine whether Bluetooth communication is to occur. However, polling the Bluetooth radio device may have to be performed on a fairly constant basis and may detract the WLAN radio device from its own WLAN communication operations. If a polling window is utilized instead, where the polling window may be as long as several hundred microseconds, the WLAN radio device may not perform its WLAN protocol operations during that time with the expectation that the Bluetooth radio device may indicate that Bluetooth communication is to occur. In other instances, the collocated WLAN and Bluetooth radio devices may utilize an interrupt-driven arbitration approach. In this regard, considerable processing time may be necessary for performing the interrupt operation and to determine the appropriate communication schedule based on the priority and type of WLAN and Bluetooth packets.

As a result of the interference or collisions that may occur between collocated radio devices in a coexistence terminal, separate antennas or antenna arrays may be utilized for each protocol supported by the radio device. However, the use of additional antenna hardware may not only result in a costlier product, but also may limit the size or form factor that may be achieved in, for example, a mobile terminal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for sharing a single antenna on platforms with collocated Bluetooth and IEEE 802.11b/g devices, substantially as shown in and/or described in connection with at least one of the drawings, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharing a single antenna on platforms with collocated Bluetooth and IEEE 802.11b/g devices. A single antenna may be utilized for communication of Bluetooth HV3 frames and wireless local area network (WLAN) communication based on a time multiplexing approach. At least one antenna switch may be utilized to configure an antenna system to enable Bluetooth and WLAN coexistence via the single antenna. Configuration signals may be generated by a Bluetooth radio device and/or by a WLAN radio device to configure the antenna system. In one embodiment of the invention, a default configuration for the antenna system may provide WLAN communication between a coexistence station and a WLAN access point until Bluetooth communication becomes a priority. The use of a single antenna for Bluetooth and WLAN radio devices may result in cost reductions in the manufacturing of coexistence terminals.

Figure 1A:
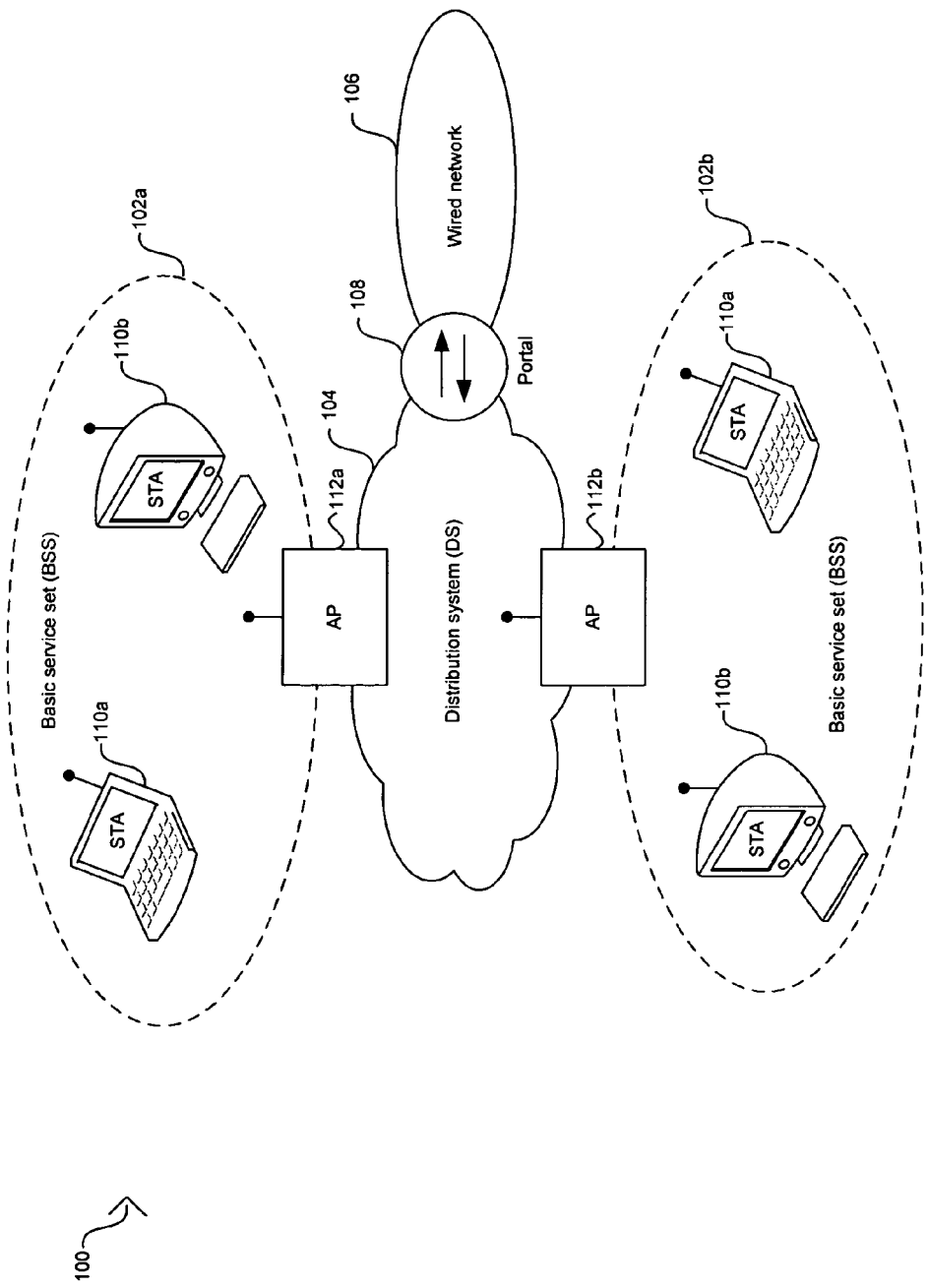
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be adapted to provide connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

Figure 1B:
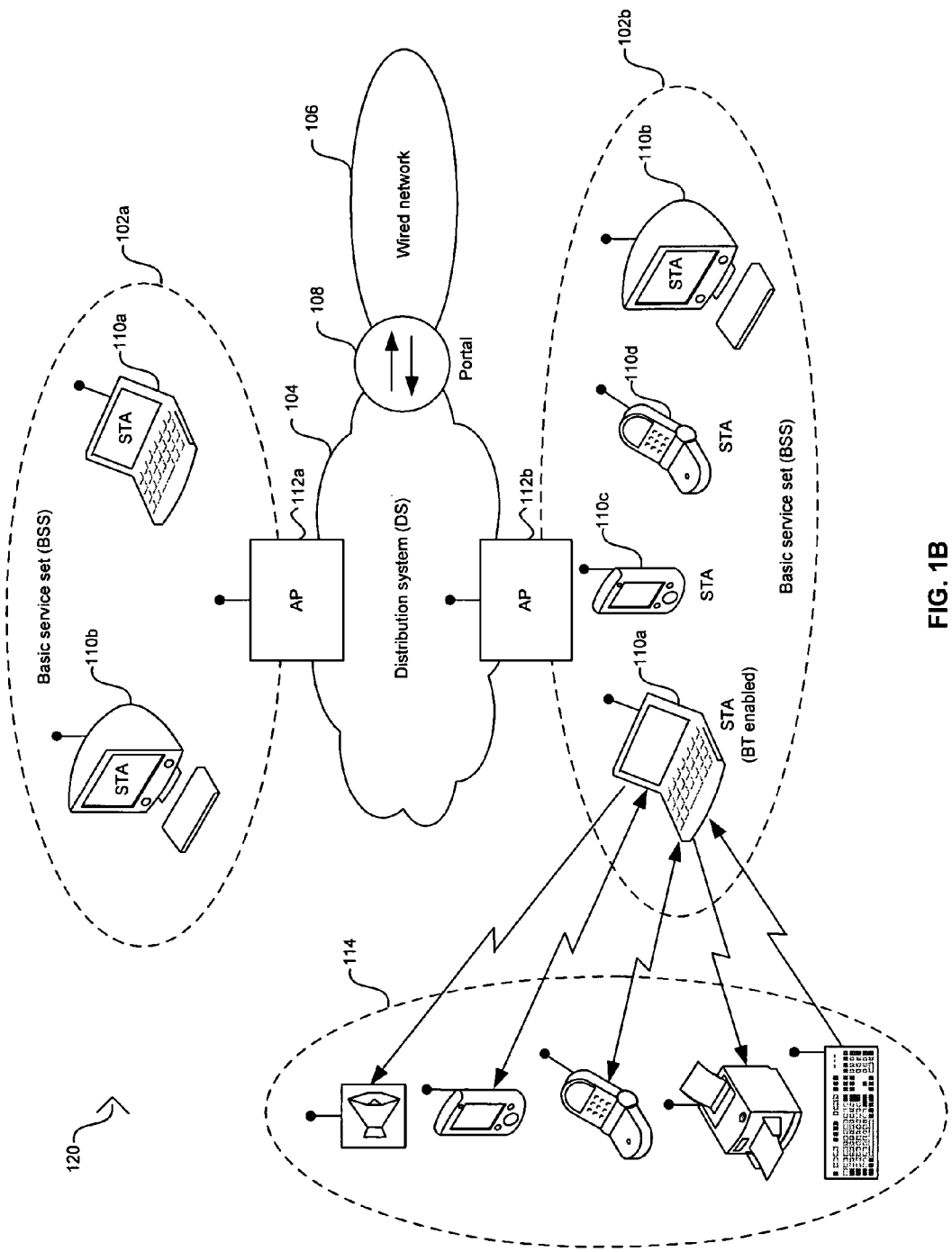
FIG. 1B is a block diagram of an exemplary WLAN infrastructure network comprising a basic service set (BSS) with stations that support WLAN/Bluetooth coexistence, in accordance with an embodiment of the invention.

FIG. 1B is a block diagram of an exemplary WLAN infrastructure network comprising a basic service set (BSS) with stations that support WLAN/Bluetooth coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises additional mobile terminals or stations such as a Personal Digital Assistant (PDA) 110c and a mobile phone 110d while the laptop computer 110a is now shown to be Bluetooth-enabled. The peripheral devices 114 shown may be part of the Wireless Personal Area Network (WPAN) supported by the Bluetooth-enabled laptop computer. For example, the laptop computer 110a may communicate via Bluetooth technology with a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 100 via the AP 112b and with the Bluetooth piconet respectively. Because of the size of the laptop computer 110a, locating the WLAN and BT radio devices in the same terminal may result in signal interference between WLAN and BT communications. When the PDA 110c and/or the mobile phone 110d are Bluetooth-enabled, the small form factor of these coexistence terminals may result in a small radio frequency (RF) path loss between WLAN and BT radio devices and likely interference between WLAN and BT communications.

Figure 1C:
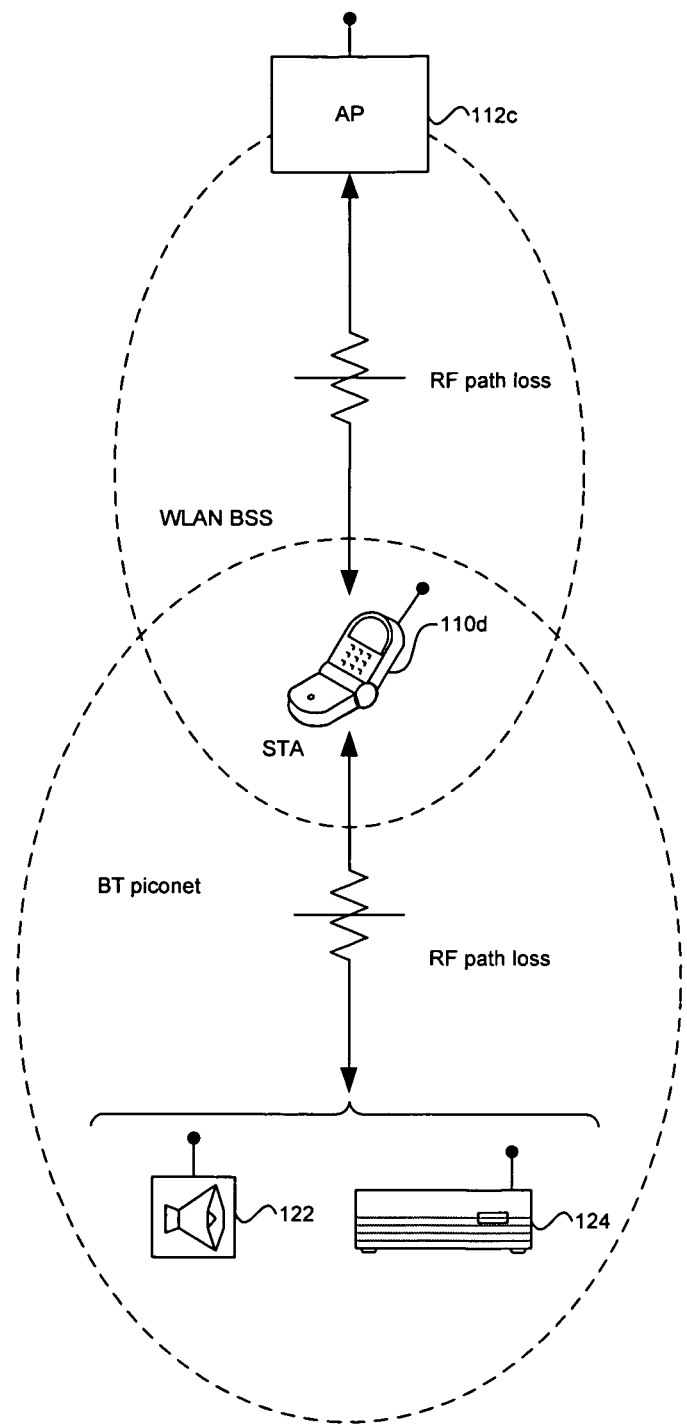
FIG. 1C is a block diagram that illustrates an exemplary usage model for a coexistence terminal with collocated WLAN and Bluetooth radio devices, in accordance with an embodiment of the invention.

FIG. 1C is a block diagram that illustrates an exemplary usage model for a coexistence terminal with collocated WLAN and Bluetooth radio devices, in accordance with an embodiment of the invention. Referring to FIG. 1C, the mobile phone 110d may comprise a WLAN radio device to communicate with the AP 112c. The RF path loss between the AP 112c and the mobile phone 110d may be, for example, 65 dB for 10 meters. The IEEE 802.15.2 draft, for example, provides a formula for calculating the RF path loss. The mobile phone 110d may also be Bluetooth-enabled and may comprise a Bluetooth radio device to communicate with, for example, a Bluetooth headset 122 and/or a home gateway 124 with Bluetooth cordless telephony capability. Because of the small form factor of the mobile phone 110d, the WLAN and Bluetooth radio devices may be in such close proximity to each other within the same coexistence terminal that the isolation between them is sufficiently low to allow desensitization of one radio device by the other.

The Bluetooth-enabled mobile phone 110d may comprise two transmission power levels. For example, the mobile phone 110d may operate as a Class 1 power level terminal with a maximum transmission power of 20 dBm to communicate with the home gateway 124. In another example, the mobile phone 110d may operate as a Class 2 power level terminal with a maximum transmission power of 4 dBm to communicate with the Bluetooth headset 122. The Bluetooth headset 122 may comprise suitable hardware, logic, circuitry, and/or code that may be adapted to receive and/or transmit audio information. For example, the Bluetooth handset 122 may be adapted to receive and/or transmit Continuous Variable Slope Delta (CVSD) modulated voice from the mobile phone 110d or receive A2DP, such as MP3, from the mobile phone 110d. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110d may receive voice or audio content from the WLAN infrastructure network via the AP 112c and may communicate the voice or audio contents to the Bluetooth headset 122 or the voice contents to the home gateway 124. Similarly, the Bluetooth headset 122 the home gateway 124 may communicate voice contents to the Bluetooth-enabled mobile phone 110d which in turn may communicate the voice contents to other users through the WLAN infrastructure network.

A Bluetooth-enabled station, such as the Bluetooth-enabled mobile phone 110d in FIG. 1C, for example, may support the communication of multiple Bluetooth packets. For example, a Bluetooth-enabled station may support synchronous connection-oriented (SCO) logical transport packets such as HV3 packets.

Figure 2A:
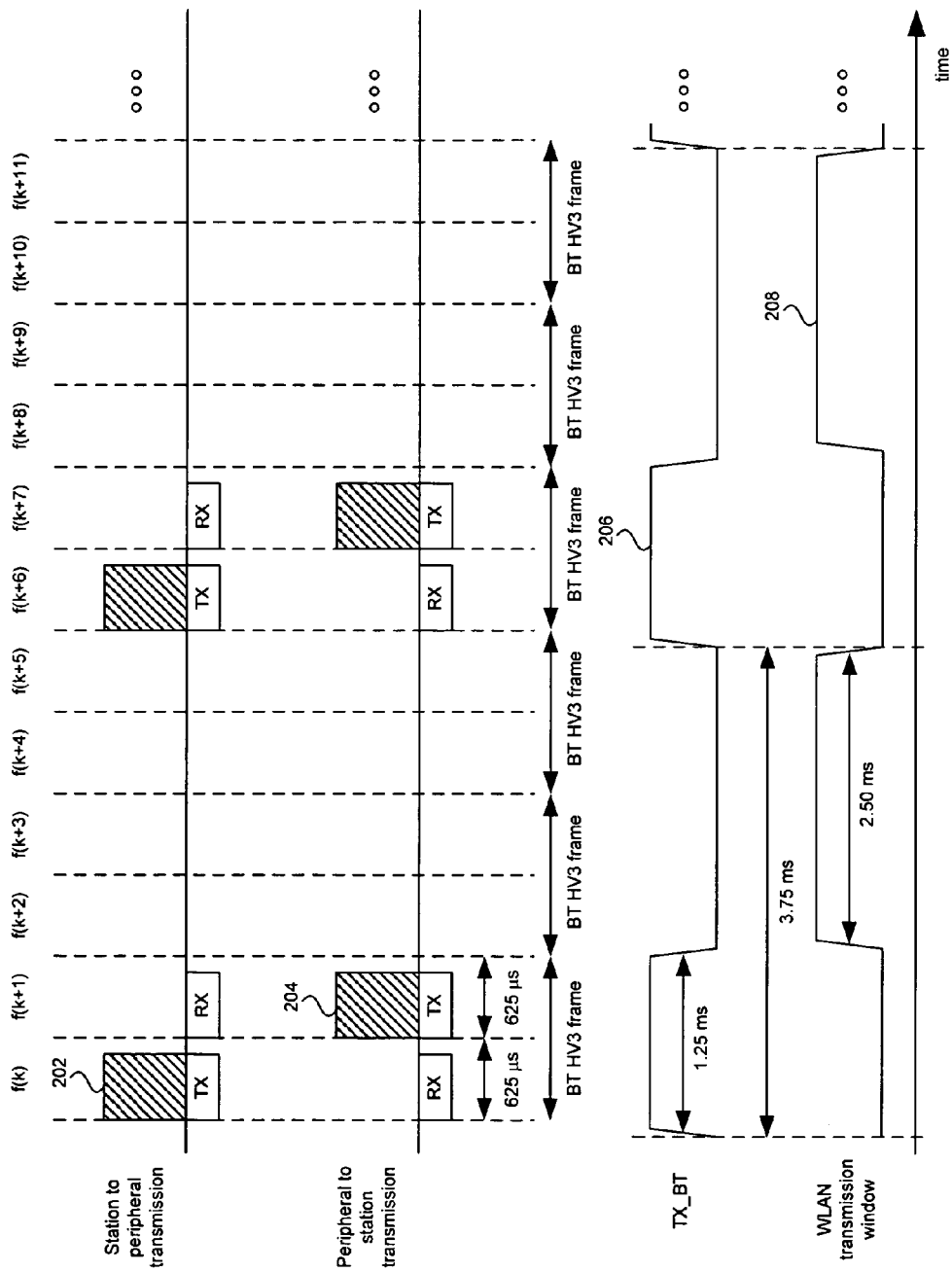
FIG. 2A is a timing diagram that illustrates an exemplary communication of BT HV3 frames and WLAN transmissions based on the TX_BT signal, in accordance with an embodiment of the invention.

FIG. 2A is a timing diagram that illustrates an exemplary communication of BT HV3 frames and WLAN transmissions based on the TX_BT signal, in accordance with an embodiment of the invention. Referring to FIG. 2A, a Bluetooth radio device in a Bluetooth-enabled station may be adapted to communicate Bluetooth (BT) HV3 packets. A BT HV3 packet may be generally used for 64 kb/s speech transmission but need not be so limited. The BT HV3 packet may comprise 30 information bytes with a payload length of 240 bits and no payload header present. The bytes are not protected by forward error correction (FEC) and no cyclic redundancy check (CRC) is present. Because retransmission of BT HV3 packets is not supported, when a BT HV3 packet is not received, the quality of the overall transmission is reduced since the information contained in the lost BT HV3 packet will not be retransmitted. As a result, BT HV3 packets may require a higher priority of transmission to avoid interference with WLAN transmission.

Referring back to FIG. 2A, there is shown an exemplary timing representation of BT HV 3 communication from a coexistence station or terminal. The transmission of a pair of BT HV3 packets between a station or terminal and a peripheral device is referred to as a BT HV3 frame. A packet 202 may be transmitted from the station to the peripheral device in time slot f(k) and a packet 204 may be transmitted from the peripheral device to the station in time slot f(k+1). A time slot in Bluetooth communication is 625 µs in duration and each time slot may correspond to a different frequency in an adaptive frequency hopping (AFH) hopping sequence. A BT HV3 frame is 1.25 ms in duration. Transmission of BT HV3 packets from the coexistence terminal may occur every sixth time slot or every third BT HV3 frame. For example, a first packet may be transmitted from the station during time slot f(k) and a next packet may be transmitted from the station during time slot f(k+6). Similarly, the station may receive a first packet during time slot f(k+1) and the station may receive a next packet during time slot f(k+7). As a result, no Bluetooth transmission may occur over a period of two BT HV3 frames providing a WLAN transmission window of 2.5 ms.

As shown, the TX_BT signal 206 may be asserted during time slots f(k) and f(k+1) and during time slots f(k+6) and f(k+7) to provide priority transmission to the BT HV3 packets over WLAN transmission. Asserting the TX_BT signal 206 may disable WLAN transmissions in a WLAN radio device in the coexistence station, for example. The WLAN transmission window 208 illustrates a period of time between assertions of the TX_BT signal 206 when the WLAN radio device may transmit WLAN packets. In this example, the WLAN radio device may transmit WLAN packets during time slots f(k+2) through f(k+5) and during time slots f(k+8) through f(k+11).

Figure 2B:
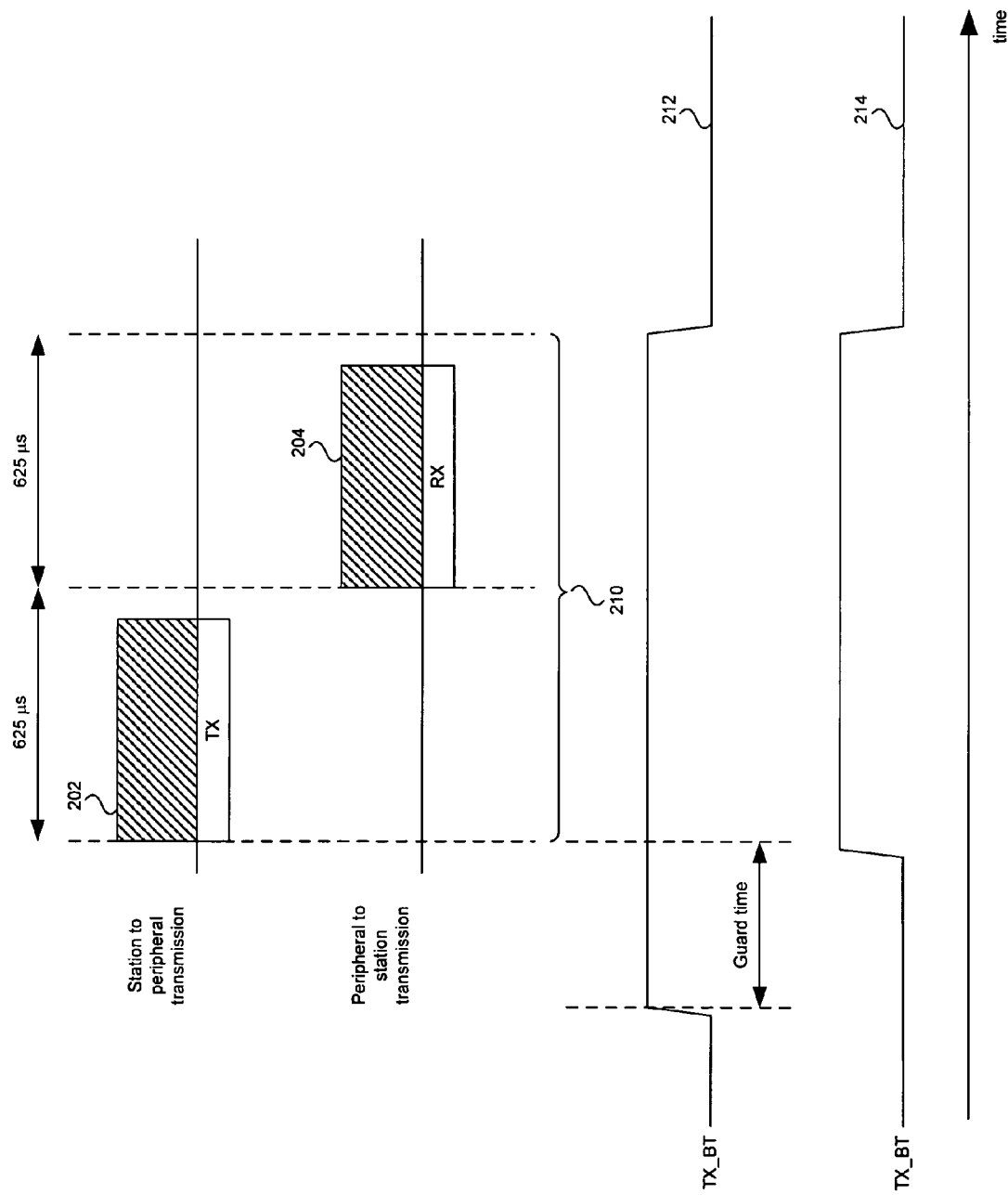
FIG. 2B is a timing diagram that illustrates exemplary assertion instances of the TX_BT signal, in accordance with an embodiment of the invention.

FIG. 2B is a timing diagram that illustrates exemplary assertion instances of the TX_BT signal, in accordance with an embodiment of the invention. Referring to FIG. 2B, there is shown a BT HV3 frame 210, a first TX_BT signal 212, and a second TX_BT signal 214. The first TX_BT signal 212 may be asserted prior to the start of the BT HV3 frame 210 in order to provide firmware and/or hardware in a WLAN radio device in a coexistence station with time to complete or terminate a current WLAN packet transmission. The first TX_BT signal 212 may be asserted within a guard time. This guard time may range from just prior to the start of the BT HV3 frame 210 to 200 µs to 250 µs prior to the start of the BT HV3 frame 210. In this regard, firmware and/or hardware in the WLAN radio device may generate and/or store information regarding the completion or termination of the current WLAN packet transmission. The WLAN radio device may utilize the information generated and/or stored to resume WLAN packet communications after the first BT_TX signal 212 is deasserted.

In another embodiment of the assertion operation, the second TX_BT signal 214 may be asserted immediately prior to the start of the BT HV3 frame 210 in order to terminate a current WLAN packet transmission by a WLAN radio device in a coexistence station. This approach may be utilized when, for example, the second TX_BT signal 214 may be asserted on a pin that turns OFF a power amplifier utilized for supporting WLAN packet transmissions in the WLAN radio device. In this regard, firmware and/or hardware in the WLAN radio device may generate and/or store information regarding the termination of the current WLAN packet transmission. The WLAN radio device 204 may utilize the information generated and/or stored to resume WLAN packet communications after the second BT_TX signal 214 is deasserted.

Figure 3A:
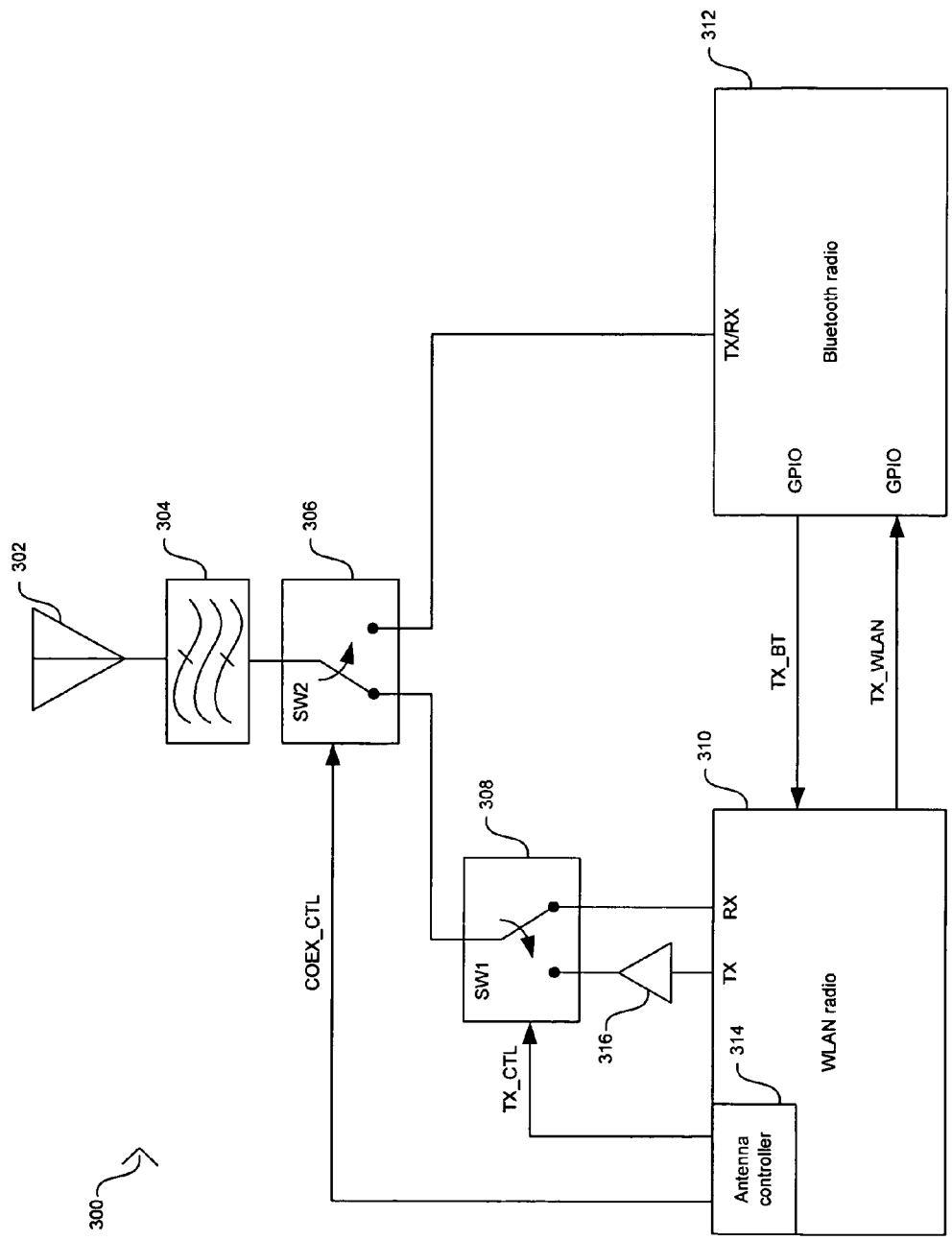
FIG. 3A is a block diagram of an exemplary WLAN/Bluetooth collaborative radio architecture with two antenna switches configured by a WLAN radio device, in accordance with an embodiment of the invention.

FIG. 3A is a block diagram of an exemplary WLAN/Bluetooth collaborative radio architecture with two antenna switches configured by a WLAN radio device, in accordance with an embodiment of the invention. Referring to FIG. 3A, the WLAN/Bluetooth collaborative radio architecture 300 may comprise a single antenna 302, a bandpass filter 304, a first antenna switch (SW1) 308, a second antenna switch (SW2) 306, a WLAN radio device 310, a Bluetooth radio device 312, and a power amplifier (PA) 316. The WLAN radio device 310 may comprise an antenna controller 314.

The single antenna 302 may comprise suitable hardware that may be adapted to provide transmission and reception of Bluetooth and WLAN communication. In this regard, the single antenna 302 may be utilized for transmission and reception of a plurality of communication protocols. The bandpass filter 304 may comprise suitable hardware, logic, and/or circuitry that may be adapted to perform bandpass polyphase filtering on communication signals, for example. The bandpass filter 304 may be configured to conform to the bandpass requirements for the ISM band.

The SW1 308 and the SW2 306 may comprise suitable hardware, logic, and/or circuitry that may be adapted to select from signals at two input port signals one that may be connected to an output port. The SW1 308 and SW2 306 may be implemented by utilizing, for example, single pull double throw (SPDT) switching devices. The selection operation of the SW1 308 may be controlled by a control signal such as a WLAN transmission control (TX_CTL) signal generated by the antenna controller 314. The selection operation of the SW2 306 may be controlled by a control signal such as the coexistence control (COEX_CTL) signal generated by the antenna controller 314.

The WLAN radio device 310 may comprise suitable logic, circuitry, and/or code that may be adapted to process WLAN protocol packets for communication. The antenna controller 314 in the WLAN radio device 310 may comprise suitable logic, circuitry, and/or code that may be adapted to generate at least the TX_CTL and/or COEX_CTL control signals for configuring the station to receive and/or transmit WLAN and/or BT data. As shown, the WLAN radio device 310 may comprise separate ports for transmission (TX) and reception (RX) of WLAN packet traffic. However, a single TX/RX port may also be utilized for WLAN communication. The WLAN radio device 310 may be adapted to generate a WLAN transmission (TX_WLAN) signal and to assert the TX_WLAN signal during WLAN communication. The WLAN radio device 310 may also be adapted to receive a Bluetooth priority (TX_BT) signal from the Bluetooth radio device 312. When the Bluetooth radio device 312 asserts the TX_BT signal, the transmission of WLAN traffic from the WLAN radio device 310 may be disabled. No polling or interrupt-driven mechanism need be utilized. In this regard, disabling the transmission path in the WLAN radio device 310 may be performed by, for example, utilizing a general purpose input/output (GPIO) pin. This approach may be similar to disabling a WLAN device in airplanes so that passengers may be sure the radios in their portable devices are turned OFF and cannot interfere with the airplane's systems. When the Bluetooth radio device 312 deasserts the TX_BT signal, the transmission of WLAN traffic from the WLAN radio device 310 may be enabled. Firmware operating in the WLAN radio device 310 may track the traffic status when WLAN transmission is disabled and may utilize the traffic status to resume communications once WLAN transmission is enabled.

The Bluetooth radio device 312 may comprise suitable logic, circuitry, and/or code that may be adapted to process Bluetooth protocol packets for communication. As shown, the Bluetooth radio device 312 may comprise a single port for transmission and reception (TX/RX) of Bluetooth packet traffic. The Bluetooth radio device 312 may be adapted to generate the TX_BT signal and to assert the signal when Bluetooth frames, such as BT HV3 frames, for example, are available for communication. The TX_BT signal may be transferred to the WLAN radio device via a GPIO pin in the Bluetooth radio device 312. The Bluetooth radio device 312 may also be adapted to deassert the TX_BT signal when communication of the Bluetooth frames has been completed.

In some instances, either the WLAN radio device 310 or the Bluetooth radio device 312 may be disabled and the station may not operate in a coexistence mode. When the WLAN radio device 312 is disabled, the SW1 308 and/or the SW2 306 may utilize a default configuration to support Bluetooth communication. When the Bluetooth radio device 312 is disabled, the SW1 308 and/or the SW2 306 may utilize a default configuration to support WLAN communication.

The WLAN radio device 310 packet transmission may be disabled by completing or terminating operations performed by firmware operating in the WLAN radio device 310 or by turning OFF a power amplifier internal or external to the WLAN radio device 310 when the TX_BT signal is asserted. When the Bluetooth radio device 312 deasserts the TX_BT signal, communication of WLAN traffic through the WLAN radio device 310 may be enabled. The PA 316 may comprise suitable logic and/or circuitry that may be adapted to boost the outgoing WLAN signal coming from the WLAN radio device 310. In some instances, disabling the PA 316 may disable the WLAN capabilities in the station. In this regard, the PA 316 may be disabled when the TX_BT signal is asserted, for example.

In operation, the Bluetooth radio device 312 may check the status of the TX_WLAN signal to determine whether the WLAN radio device 310 is utilizing the single antenna 302 for WLAN communication. When a BT HV3 frame is to be transmitted, the Bluetooth radio device 312 may assert the TX_BT signal to gain priority over WLAN transmission. Asserting the TX_BT signal may result in disabling the WLAN transmission capabilities and generating signals that configure SW1 308 and SW2 306 to connect the single antenna 302 to the TX/RX port in the Bluetooth radio device 312. In this regard, the antenna controller 314 may generate, based on the assertion of the TX_BT signal, the TX_CTL and COEX_CTL signals to configure the SW1 308 and SW2 306 respectively. While the SW2 306 may provide sufficient isolation between the WLAN radio device 310 and the Bluetooth radio device 312, appropriately configuring the SW1 308 may result in improved isolation. For example, selecting the RX port in the WLAN radio device 310 in the SW1 308 may result in better isolation between radio devices. The Bluetooth radio device 312 may deassert the TX_BT signal when BT data communication has been completed and the WLAN/Bluetooth collaborative radio architecture 300 may be reconfigured to a default configuration, for example, WLAN data communication.

Figure 3B:
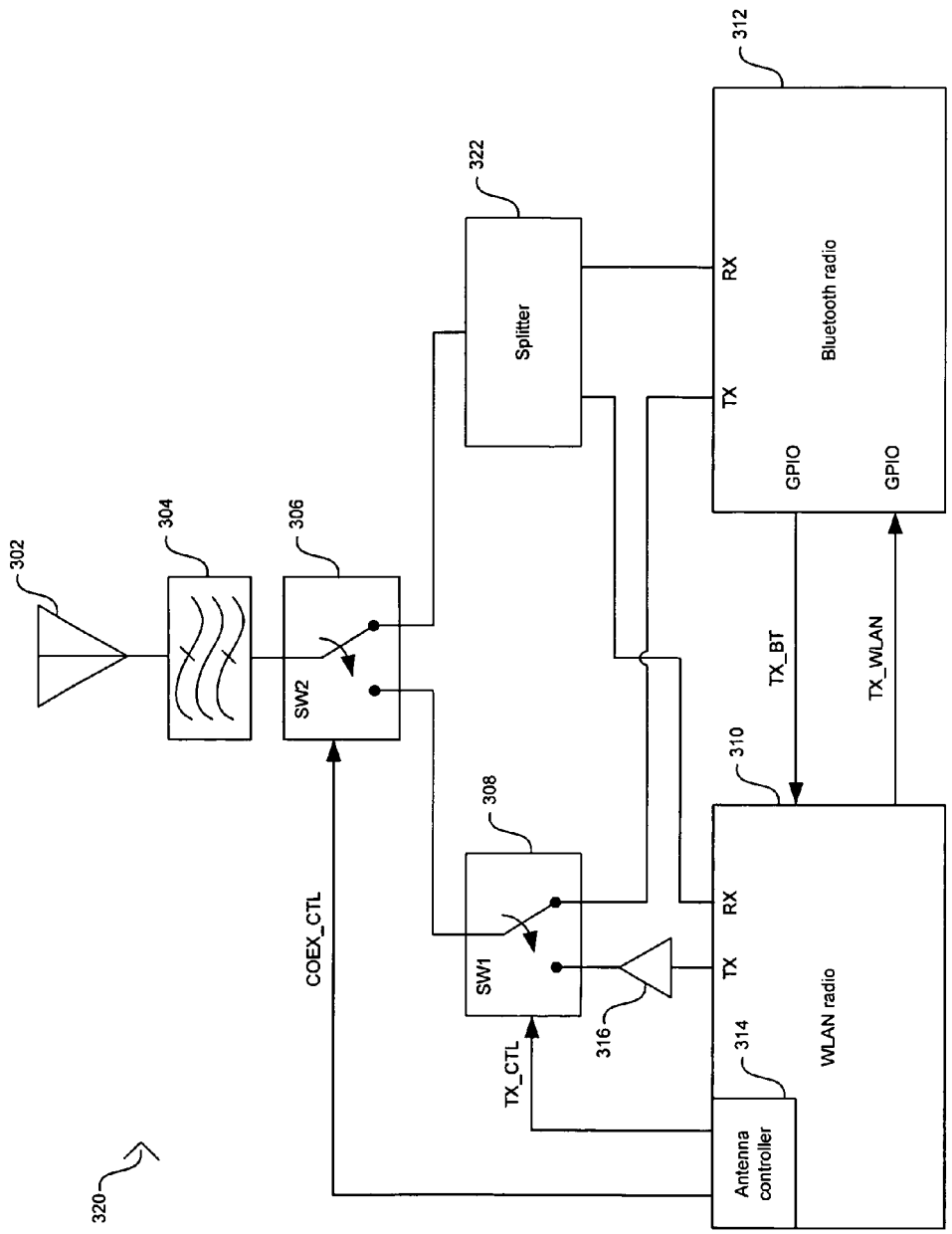
FIG. 3B is a block diagram of an exemplary WLAN/Bluetooth collaborative radio architecture with two antenna switches configured by a WLAN radio device and a splitter, in accordance with an embodiment of the invention.

FIG. 3B is a block diagram of an exemplary WLAN/Bluetooth collaborative radio architecture with two antenna switches configured by a WLAN radio device and a splitter, in accordance with an embodiment of the invention. Referring to FIG. 3B, the WLAN/Bluetooth collaborative radio architecture 320 may comprise the single antenna 302, the bandpass filter 304, the SW1 306, the SW2 308, the WLAN radio device 310, the Bluetooth radio device 312, the PA 316, and a splitter 322. The WLAN radio device 310 may comprise the antenna controller 314.

The WLAN/Bluetooth collaborative radio architecture 320 may differ from the WLAN/Bluetooth collaborative radio architecture 300 in FIG. 3A in that the Bluetooth radio device 312 comprises separate transmission (TX) and reception (RX) ports for Bluetooth communication and the splitter 318 is utilized to support the separate BT reception and transmission paths. The splitter 318 may comprise suitable hardware, logic, and/or circuitry that may be adapted to split a received communication data into a BT received data and a WLAN received data.

In operation, the Bluetooth radio device 312 may check the status of the TX_WLAN signal to determine whether the WLAN radio device 310 is utilizing the single antenna 302 for WLAN communication. The Bluetooth radio device 312 may assert the TX_BT signal when BT HV3 frames are to be received or transmitted. Asserting the TX_BT signal may result in disabling at least a portion of the WLAN communication capabilities and configuring SW1 308 and SW2 306 to connect the single antenna 302 to the TX or RX port in the Bluetooth radio device 312. The antenna controller 314 may generate, based on the assertion of the TX_BT signal, the COEX_CTL and TX_CTL signals to configure the SW2 306 and SW1 308 respectively.

When the Bluetooth radio device 312 is transmitting BT data, for example, the SW1 308 may be configured by the TX_CTL signal to connect the TX port of the Bluetooth radio device 312 to an input of the SW2 306 while the SW2 306 may be configured by the COEX_CTL signal to connect the output port of SW1 208 to the single antenna 302. When the Bluetooth radio device 312 is receiving BT data, for example, the SW2 306 may be configured by the COEX_CTL signal to connect the single antenna 302 to the splitter 318, which in turn is connected to the RX port of the Bluetooth radio device 312. The Bluetooth radio device 312 may deassert the TX_BT signal when BT data communication has been completed and the WLAN/Bluetooth collaborative radio architecture 320 may be reconfigured to a default configuration, for example, WLAN data reception.

Figure 3C:
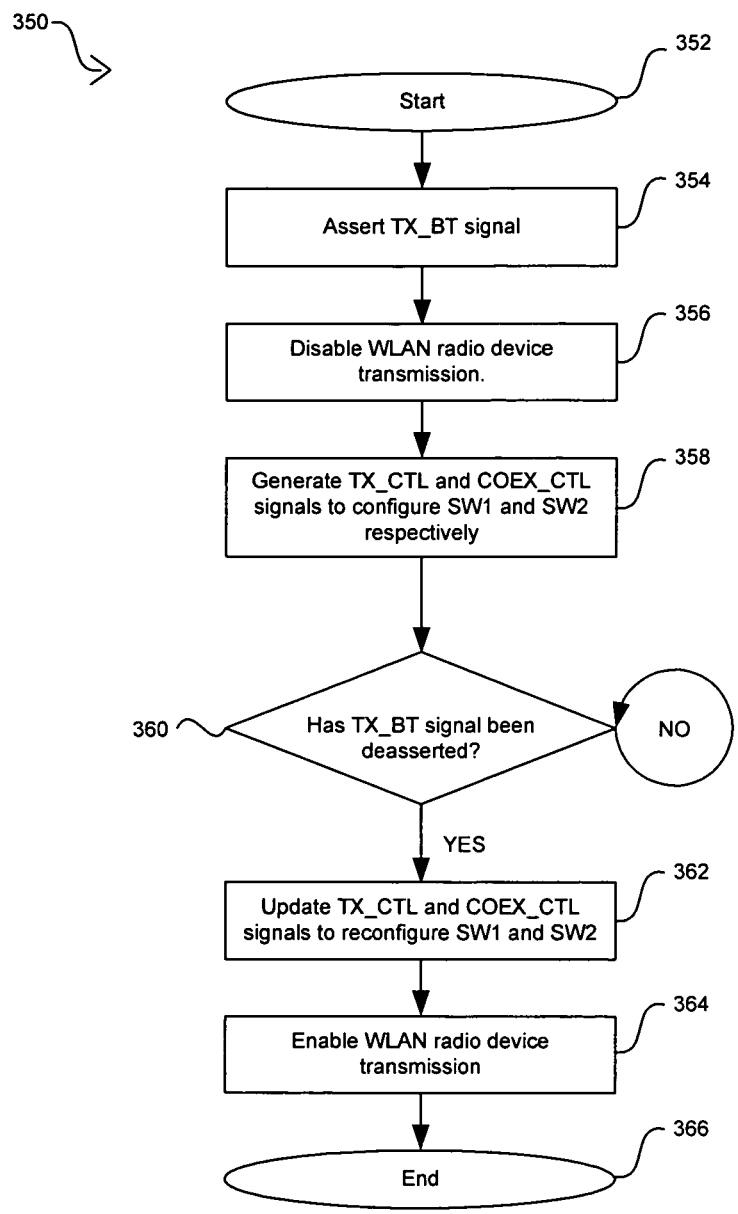
FIG. 3C is a flow diagram illustrating exemplary steps for configuring the WLAN/Bluetooth collaborative radio architecture in FIGS. 3A-3B, in accordance with an embodiment of the invention.

FIG. 3C is a flow diagram illustrating exemplary steps for configuring the WLAN/Bluetooth collaborative radio architecture in FIGS. 3A-3B, in accordance with an embodiment of the invention. Referring to FIG. 3C, after start step 352, in step 354, the Bluetooth radio device 312 may assert the TX_BT signal. In this regard, the TX_BT signal may be asserted with a guard time or may be asserted immediately prior to the transmission of BT HV3 frames. In step 356, the transmission capabilities of the WLAN radio device 310 may be disabled by either completing or terminating a WLAN packet transfer or by turning OFF the PA 316, for example.

In step 358, the antenna controller may generate the appropriate signal values for the COEX_CTL and the TX_CTL signals. In this regard, the signal values may depend on whether the Bluetooth radio device comprises separate TX and RX ports and the splitter 322 may be utilized, as shown in FIG. 3B. In step 360, the firmware and/or hardware in the WLAN radio device 310 may determine whether the TX_BT signal has been deasserted. When the TX_BT signal has not been deasserted, BT HV3 frame communication may not have been completed and the flow diagram 350 may remain in step 360. When the TX_BT signal has been deasserted, BT HV3 frame communication has been completed and the flow diagram 350 may proceed to step 362.

In step 362, after the completion of BT HV3 frame communication in step 360, the antenna controller 314 may reconfigure the SW1 308 and/or the SW2 306 to provide WLAN communication. In this regard, the antenna controller 314 may utilize information stored that corresponds to the completion or termination of WLAN communication that occurred as a result of the assertion of the TX_BT signal in order to generate the appropriate values for the COEX_CTL and the TX_CTL signals. In step 364, the WLAN transmission capabilities may be enabled in the WLAN radio device 312. In this regard, when the TX_BT signal was utilized to turn OFF the PA 316, deasserting the TX_BT signal may result in enablement of the transmission capabilities of the WLAN radio device 312. After step 364, the flow diagram 350 may proceed to end step 366.

Figure 4:
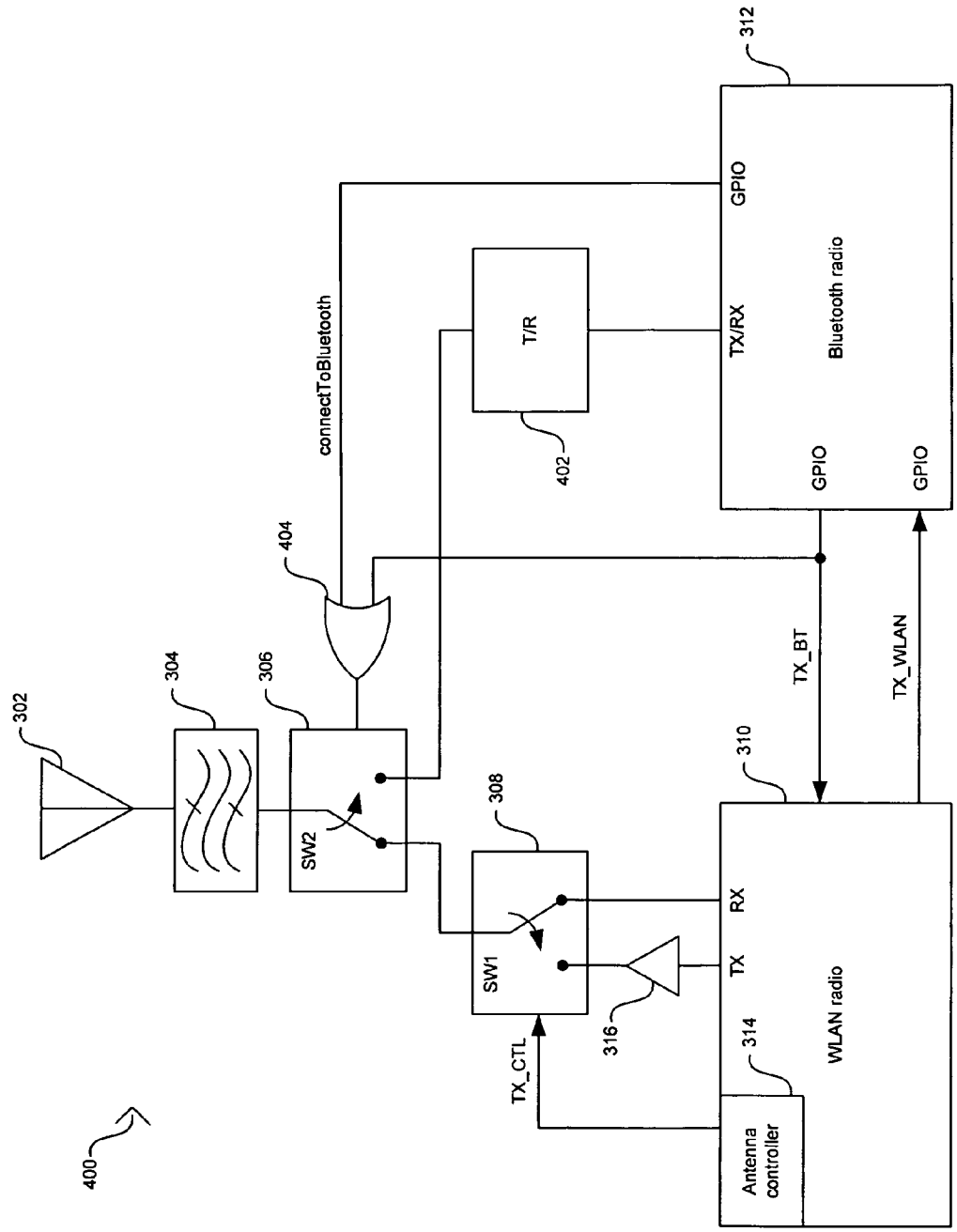
FIG. 4 is a block diagram of an exemplary WLAN/Bluetooth collaborative radio architecture with a first antenna switch configured by a WLAN radio device and a second antenna switch configured by a Bluetooth radio device, in accordance with an embodiment of the invention.

FIG. 4 is a block diagram of an exemplary WLAN/Bluetooth collaborative radio architecture with a first antenna switch configured by a WLAN radio device and a second antenna switch configured by a Bluetooth radio device, in accordance with an embodiment of the invention. Referring to FIG. 4, the WLAN/Bluetooth collaborative radio architecture 400 may comprise the single antenna 302, the bandpass filter 304, the first antenna switch (SW1) 308, the second antenna switch (SW2) 306, the WLAN radio device 310, the Bluetooth radio device 312, the power amplifier (PA) 316, a transmit/receive (T/R) block 402, and an OR-gate 404. The WLAN radio device 310 may comprise the antenna controller 314.

The WLAN/Bluetooth collaborative radio architecture 400 may differ from the WLAN/Bluetooth collaborative radio architecture 300 in FIG. 3A in that the Bluetooth radio device 312 may be adapted to generate a configuration signal, connectToBluetooth, via a GPIO port to control the configuration of the SW2 306. Moreover, the TX_BT signal may also be utilized to control the configuration of the SW2 306. The T/R block 402 may comprise suitable hardware, logic, and/or circuitry that may be adapted to process BT data that is transmitted or received by the TX/RX port in the Bluetooth radio device 312 from the configured SW2 306. For example, the T/R block 402 may be utilized to amplify BT data for transmission and/or to filter received BT data.

In operation, the Bluetooth radio device 312 may check the status of the TX_WLAN signal to determine whether the WLAN radio device 310 is utilizing the single antenna 302 for WLAN communication. The Bluetooth radio device 312 may assert the TX_BT signal communicate BT HV3 frames. Asserting the TX_BT signal may result in disabling at least a portion of the WLAN communication capabilities and configuring SW1 308 and SW2 306 to connect the single antenna 302 to the TX/RX port in the Bluetooth radio device 312. The TX_BT signal may be utilized to configure the SW2 306 for BT communication. For example, when TX_BT is asserted, the output of the OR-gate 404 may also asserted and the SW2 306 may be configured to connect the single antenna 302 to the TX/RX port in the Bluetooth radio device 312 via the T/R block 402. The Bluetooth radio device 312 may deassert the TX_BT signal when the BT HV3 data communication has been completed and the WLAN/Bluetooth collaborative radio architecture 400 may be reconfigured to a default configuration, for example, WLAN data reception.

In another embodiment of the invention, when the BT data to be communicated has retransmission capabilities, for example, the Bluetooth radio device 312 may wait or hold off for a set amount of time while the TX_WLAN signal from the WLAN radio device 310 is being asserted. When a maximum time or maximum number of BT data packets have been held off, the Bluetooth radio device 312 may assert the TX_BT signal to configure the SW1 308 and the SW2 306. When the TX_WLAN signal is not asserted and BT data, other than BT HV3 frames, is ready to be communicated, the Bluetooth radio device 212 may assert the connectToBluetooth signal. When the connectToBluetooth signal is asserted, the output of the OR-gate 404 may also asserted and the SW2 306 may be configured to connect the single antenna 302 to the TX/RX port in the Bluetooth radio device 312 via the T/R block 402. The Bluetooth radio device 312 may deassert the connectToBluetooth signal when the BT data communication has been completed and the WLAN/Bluetooth collaborative radio architecture 400 may be reconfigured to a default configuration, for example, WLAN data reception.

Figure 5A:
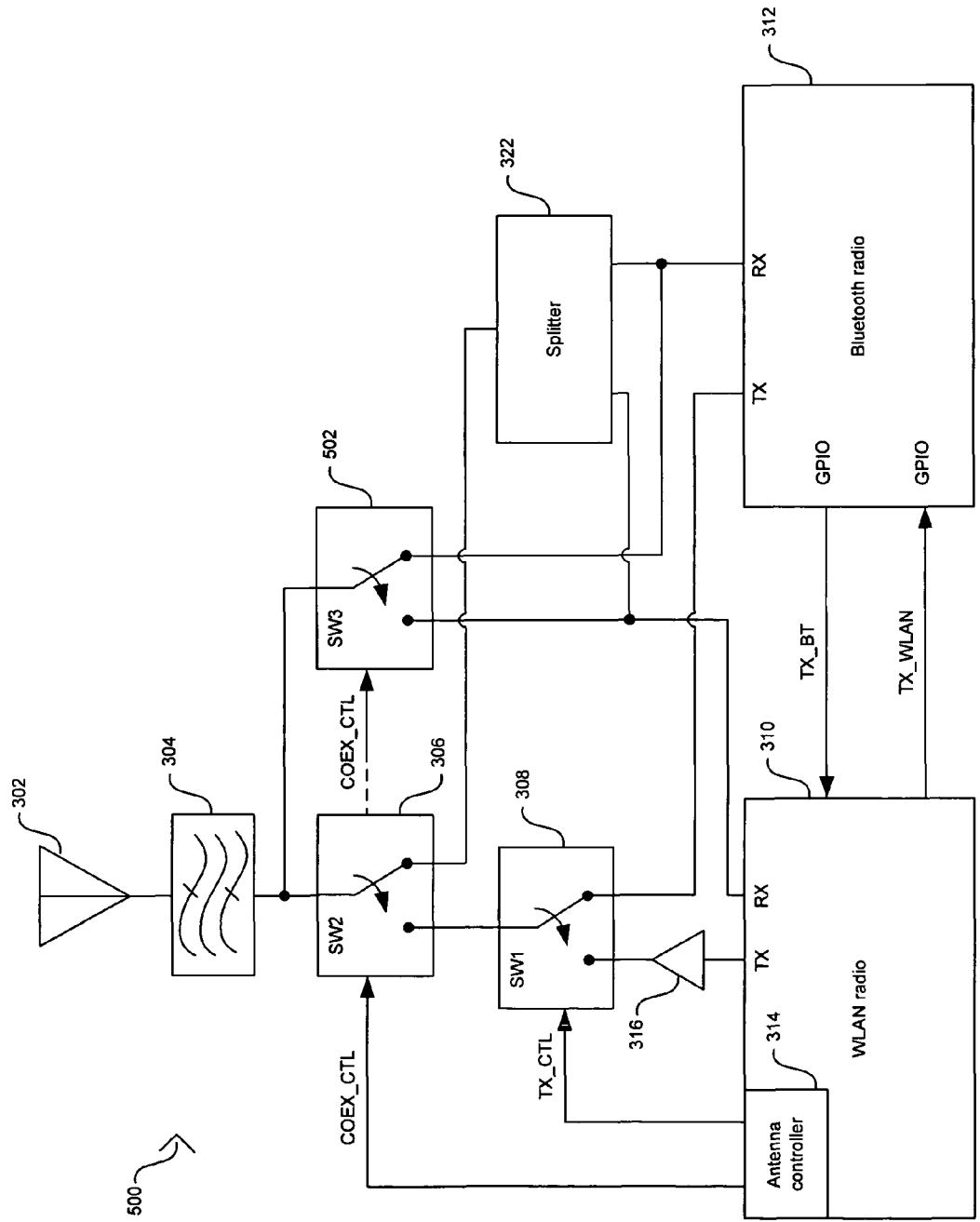
FIG. 5A is a block diagram of an exemplary WLAN/Bluetooth collaborative radio architecture with three antenna switches configured by a WLAN radio device, in accordance with an embodiment of the invention.

FIG. 5A is a block diagram of an exemplary WLAN/Bluetooth collaborative radio architecture with three antenna switches configured by a WLAN radio device, in accordance with an embodiment of the invention. Referring to FIG. 5A, the WLAN/Bluetooth collaborative radio architecture 500 may comprise the single antenna 302, the bandpass filter 304, the SW1 306, the SW2 308, a third antenna switch (SW3) 502, the WLAN radio device 310, the Bluetooth radio device 312, the PA 316, and the splitter 322. The WLAN radio device 310 may comprise the antenna controller 314.

The WLAN/Bluetooth collaborative radio architecture 500 may differ from the WLAN/Bluetooth collaborative radio architecture 320 in FIG. 3B in that the SW3 502 may be utilized to bypass the SW1 308 and the splitter 322 when receiving both WLAN and BT communication respectively. In this regard, the COEX_CTL signal generated by the antenna controller 314 may also be utilized to control the operation of the SW3 502. Bypassing the splitter 322 may be enabled when WLAN communication is active in order to avoid the signal strength loss through the splitter 322.

Figure 5B:
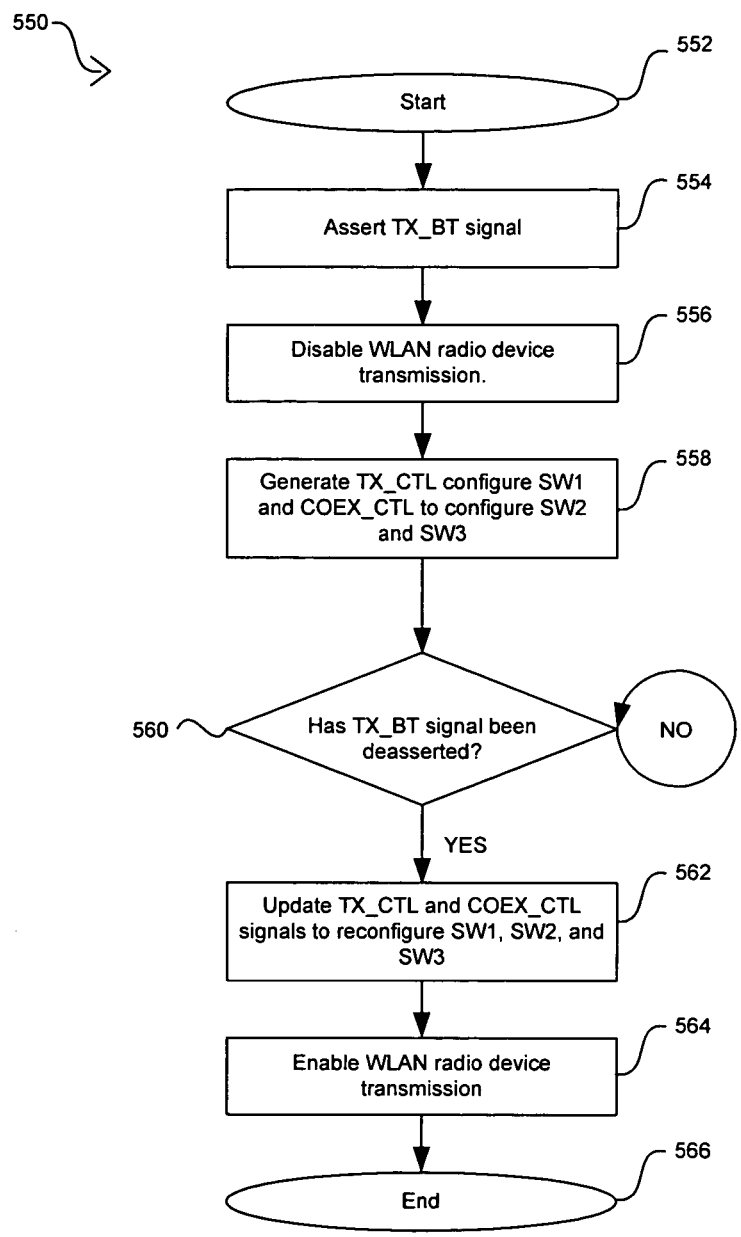
FIG. 5B is a flow diagram illustrating exemplary steps for configuring of the WLAN/Bluetooth collaborative radio architecture in FIG. 5A, in accordance with an embodiment of the invention.

FIG. 5B is a flow diagram illustrating exemplary steps for configuring of the WLAN/Bluetooth collaborative radio architecture in FIG. 5A, in accordance with an embodiment of the invention. Referring to FIG. 5B, after start step 552, in step 554, the Bluetooth radio device 312 may assert the TX_BT signal. In this regard, the TX_BT signal may be asserted with a guard time or may be asserted immediately prior to the transmission of BT HV3 frames. In step 556, the transmission capabilities of the WLAN radio device 310 may be disabled by either completing or terminating a WLAN packet transfer or by turning OFF the PA 316, for example.

In step 558, the antenna controller may generate the appropriate signal values for the COEX_CTL and the TX_CTL signals. In this regard, the COEX_CTL signal may comprise information to configure both the SW2 306 and/or the SW3 502 in accordance to whether the Bluetooth radio device 312 is receiving or transmitting a BT HV3 packet during the BT HV3 frame. In step 560, the firmware and/or hardware in the WLAN radio device 310 may determine whether the TX_BT signal has been deasserted. When the TX_BT signal has not been deasserted, BT HV3 frame communication may not have been completed and the flow diagram 550 may remain in step 560. When the TX_BT signal has been deasserted, BT HV3 frame communication has been completed and the flow diagram 550 may proceed to step 562.

In step 562, after the completion of BT HV3 frame communication in step 560, the antenna controller 314 may reconfigure the SW1 308, the SW2 306, and/or the SW3 502 to provide WLAN communication. In this regard, the antenna controller 314 may utilize information stored that corresponds to the completion or termination of WLAN communication that occurred as a result of the assertion of the TX_BT signal in order to generate the appropriate values for the COEX_CTL and the TX_CTL signals. When receiving WLAN data, for example, the SW3 502 may be configured to have the WLAN data bypass the SW1 308. In step 564, the WLAN transmission capabilities may be enabled in the WLAN radio device 312. In this regard, when the TX_BT signal was utilized to turn OFF the PA 316, deasserting the TX_BT signal may result in enablement of the transmission capabilities of the WLAN radio device 312. After step 564, the flow diagram 550 may proceed to end step 566.

The invention provides a single antenna collaborative approach between collocated WLAN and Bluetooth radio devices that achieves enhanced quality and higher throughput by recovering losses that may occur in a in a coexistent wireless station or terminal adapted for IEEE 802.11b/g and Bluetooth communication.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for providing wireless communication, the method comprising:

in a station that handles at least a Bluetooth (BT) communication protocol and a Wireless Local Area Network (WLAN) communication protocol:

asserting a BT priority signal with a time duration that includes a guard time, wherein a start time of the time duration is a start time of the guard time;

configuring said station to provide BT communication via a single antenna based on said BT priority signal, wherein a first antenna switch and a second antenna switch are configured for using said single antenna for BT and WLAN communication;

determining whether WLAN data communication occurs during the guard time;

terminating the WLAN data communication between the start time and an end time of the guard time when the WLAN data communication is determined to occur during the guard time; and communicating BT data via said single antenna while said BT priority signal is asserted between a BT radio and a WLAN radio but subsequent to the end time of the guard time associated with the BT priority signal, wherein the BT priority signal is separate from the BT data.

2. The method according to claim 1, comprising:

deasserting said BT priority signal when said communicating is complete;

storing status information associated with the WLAN data communication; and resuming the WLAN data communication based on the stored status information after the deasserting.

3. The method according to claim 2, comprising reconfiguring said station to provide WLAN communication via said single antenna when said BT priority signal is deasserted.

4. The method according to claim 1, comprising defaulting to a configuration that provides WLAN communication.

5. The method according to claim 1, comprising generating at least one signal that configures said first antenna switch and at least one signal that configures said second antenna switch.

6. The method according to claim 1, comprising configuring said first antenna switch and said second antenna switch for BT communication when said BT priority signal is asserted.

7. The method according to claim 1, comprising configuring said first antenna switch and said second antenna switch for WLAN communication when said BT priority signal is deasserted.

8. The method according to claim 1, comprising configuring a third antenna switch in said station for receiving BT communication or receiving WLAN communication.

9. The method according to claim 8, comprising generating at least one signal that configures said third antenna switch.

10. The method according to claim 1, comprising asserting said BT priority signal when said BT data comprises BT HV3 packet traffic.

11. A system for providing wireless communication, the system comprising:

a station that is operable to handle at least a Bluetooth (BT) communication protocol and a Wireless Local Area Network (WLAN) communication protocol, wherein said station comprises:

a BT radio that is operable to generate a BT priority signal, wherein the BT radio is configured to assert the BT priority signal with a time duration that includes a guard time, wherein a start time of the time duration is a start time of the guard time;

a WLAN radio that is operable to configure at least a portion of said station to provide BT communication via a single antenna based on said generated BT priority signal, determine whether WLAN data communication occurs during the guard time, and terminate the WLAN data communication between the start time and an end time of the guard time when the WLAN data communication is determined to occur during the guard time, wherein a first antenna switch and a second antenna switch are configured for using said single antenna for BT and WLAN communication; and said BT radio being operable to communicate BT data via said single antenna while said generated BT priority signal is asserted between the BT radio and the WLAN radio but subsequent to the end time of the guard time associated with the BT priority signal, wherein the BT priority signal is separate from the BT data.

12. The system according to claim 11, wherein:

said WLAN radio is configured to store status information associated with WLAN data scheduled to be transmitted within the guard time, and said BT radio is operable to deassert said generated BT priority signal.

13. The system according to claim 12, wherein said WLAN radio is operable to reconfigure at least a portion of said station to provide WLAN communication via said single antenna when said BT priority signal is deasserted.

14. The system according to claim 11, wherein said station defaults to a configuration that provides WLAN communication.

15. The system according to claim 11, wherein said WLAN radio is operable to generate at least one signal that configures said first antenna switch and at least one signal that configures said second antenna switch.

16. The system according to claim 11, wherein said WLAN radio is operable to configure said first antenna switch and said second antenna switch for BT communication when said BT priority signal is asserted.

17. The system according to claim 11, wherein said WLAN radio is operable to configure said first antenna switch and said second antenna switch for WLAN communication when said BT priority signal is deasserted.

18. The system according to claim 11, wherein said station comprises a third antenna switch.

19. The system according to claim 18, wherein said BT radio is operable to generate at least one signal that configures said third antenna switch.

20. The system according to claim 11, wherein said BT radio is operable to assert said BT priority signal when said BT data comprises BT HV3 packet traffic.

21. A method for providing wireless communication, the method comprising:

in a station that handles at least a first communication protocol and a second communication protocol:

asserting a first communication protocol priority signal with a time duration that includes a guard time, wherein a start time of the time duration is a start time of the guard time, wherein the first communication protocol priority signal is a Bluetooth priority signal;

configuring said station to provide first communication protocol communication via a single antenna based on said first communication protocol priority signal, wherein a first antenna switch and a second antenna switch are configured for using said single antenna for first and second communication protocol communication;

determining whether data communication associated with the second communication protocol occurs during the guard time;

terminating the data communication between the start time and an end time of the guard time when the data communication is determined to occur during the guard time; and communicating first communication protocol data via said single antenna while said first communication protocol priority signal is asserted between a first communication protocol radio and a second communication protocol radio but subsequent to the end time of the guard time associated with the first communication protocol priority signal, wherein the first communication protocol priority signal is separate from the first communication protocol data.

22. The method according to claim 21, comprising:
deasserting said first communication protocol priority signal when said communicating is complete; and
storing status information associated with data of the second communication protocol scheduled to be transmitted within the guard time.

23. The method according to claim 21, comprising reconfiguring said station to provide second communication protocol communication via said single antenna when said first communication protocol priority signal is deasserted.

24. The method according to claim 21, comprising defaulting to a configuration that provides second communication protocol communication.

* * * * *